United States Patent
Kurita et al.

(10) Patent No.: US 7,124,625 B1
(45) Date of Patent: Oct. 24, 2006

(54) GLIDE-HEIGHT DISK-TESTER AND METHOD OF OPERATION

(75) Inventors: Masayuki Kurita, Fujisawa (JP); Remmelt Pit, Cupertino, CA (US); Shozo Saegusa, Chiyoda-machi (JP); Toshiya Shiramatsu, Odawara (JP); Mike Suk, San Jose, CA (US); Hideaki Tanaka, Odawara (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/131,736

(22) Filed: May 17, 2005

(51) Int. Cl.
*G01B 5/28* (2006.01)
*G01B 21/30* (2006.01)

(52) U.S. Cl. .................. 73/105; 73/1.81; 73/1.89; 73/104; 324/212

(58) Field of Classification Search ............... 73/1.79, 73/1.81, 1.89, 104, 105; 324/210–212; 360/270, 360/290
See application file for complete search history.

(56) References Cited

U.S. PATENT DOCUMENTS

| | | | |
|---|---|---|---|
| 5,805,284 A | 9/1998 | Lacey | |
| 5,825,181 A * | 10/1998 | Schaenzer et al. | 324/212 |
| 5,956,217 A * | 9/1999 | Xuan et al. | 360/135 |
| 5,991,113 A | 11/1999 | Meyer et al. | |
| 6,003,364 A * | 12/1999 | Yao et al. | 73/105 |
| 6,016,692 A | 1/2000 | Schaenzer et al. | |
| 6,023,963 A | 2/2000 | Schaenzer et al. | |
| 6,057,975 A | 5/2000 | Yaeger et al. | |
| 6,071,007 A * | 6/2000 | Schaenzer et al. | 374/7 |
| 6,164,118 A | 12/2000 | Suzuki et al. | |
| 6,185,993 B1 | 2/2001 | Schaenzer et al. | |
| 6,239,951 B1 | 5/2001 | Wang et al. | |
| 6,272,909 B1 | 8/2001 | Yao et al. | |
| 6,293,135 B1 | 9/2001 | Marchon et al. | |
| 6,452,735 B1 | 9/2002 | Egan et al. | |
| 6,568,252 B1 | 5/2003 | Boutaghou | |
| 6,577,466 B1 | 6/2003 | Meyer et al. | |
| 6,619,105 B1 | 9/2003 | Yao et al. | |
| 6,771,453 B1 | 8/2004 | Baumgartner et al. | |
| 6,899,456 B1 * | 5/2005 | Sundaram et al. | 374/4 |
| 6,963,464 B1 * | 11/2005 | Xu et al. | 360/75 |
| 6,992,850 B1 * | 1/2006 | Nishiyama | 360/75 |
| 6,999,265 B1 * | 2/2006 | Schreck et al. | 360/75 |
| 2003/0174430 A1* | 9/2003 | Takahashi et al. | 360/75 |
| 2006/0023354 A1* | 2/2006 | Stipe | 360/128 |

* cited by examiner

*Primary Examiner*—Hezron Williams
*Assistant Examiner*—David A. Rogers
(74) *Attorney, Agent, or Firm*—Thomas R. Berthold

(57) ABSTRACT

A glide-height disk-tester operates with the test disk rotating at a predetermined constant rotational speed and uses a glide head with an electrically-resistive heater and a thermally-responsive protrusion pad located on its trailing end. The linear velocity of the disk relative to the slider maintains the slider at its nominal fly height, which is typically higher than any expected asperity. With no current applied to the heater, the protrusion pad is generally flush with the air-bearing surface of the slider. Increasing levels of current are applied to the heater, which causes movement of the protrusion pad toward the disk surface. When the pad contacts an asperity, the current level applied at the instant of asperity contact is recorded. The applied current level can be correlated to the glide height from a previous calibration process using a calibration disk with known calibration bump heights.

16 Claims, 4 Drawing Sheets

GLIDE-HEIGHT DISK-TESTER AND METHOD OF OPERATION

BACKGROUND OF THE INVENTION

1. Field of the Invention

This invention relates to glide-height disk-testers for testing the surfaces of recording disks, such as disks used in magnetic recording disk drives.

2. Description of the Related Art

Magnetic recording disk drives use magnetoresistive (MR) read heads for reading the recorded data from the disks. The MR heads are extremely sensitive to small physical asperities that project from the surface of the disk. If the MR head contacts an asperity there is a momentary frictional heating of the MR element. This heating, called a thermal asperity, increases the resistance of the MR element, which causes data errors and loss of information in reading the disk. In addition, asperities can also physically damage or scratch the read or write head.

To assure that the disks are free of asperities that would project high enough to be contacted by the MR head, one of the final steps in the manufacturing of disks is a glide-height test. The disk must have a qualified glide height (QGHT) to be acceptable, meaning that no asperities should be higher that QGHT. In the conventional glide-height disk-tester the disk is placed on a spin stand and rotated at an initial high speed. A glide slider (also called a glide head), similar to the slider that supports the MR head in the disk drive but typically without a read/write head, is maintained above the surface of the rotating disk and moved radially across the disk surface as the disk rotates. The slider contains a contact sensor, such as a piezoelectric element, that generates an electrical signal when the slider contacts an asperity. With the disk rotating at its initial high speed, the slider is initially flying higher than any expected asperity. The rotational speed is then continuously reduced, which reduces the fly height of the slider, until an asperity, or a predetermined number of asperities, are detected. The glide height at the time of asperity detection is determined from the known disk rotational speed and the radial position of the slider at the instant of asperity contact. The relationship between the linear velocity of the disk relative to the slider (determined from disk rotational speed and radial location of the slider), is well known and can be previously calibrated for a particular slider design.

This method of determining glide height from the known linear velocity of the disk relative to the slider is less reliable as flying heights in disk drives become reduced to tens of nanometers or less. For example, commercially available disk drives now have flying heights of 6–8 nm. In addition, the output signal from the contact sensor is affected by the velocity at impact with the asperity, so that if different asperities are contacted at different velocities, it is difficult to estimate the relative sizes of the asperities. Also, because the linear velocity is not the same for each asperity contact, the pitch and roll of the slider is different for each asperity contact, which makes it difficult to compare different signals from the contact sensor.

What is needed is a glide-height disk-tester that does not rely on the relationship between disk linear velocity relative to the slider and fly height of the slider to determine glide height at the instant of asperity contact.

SUMMARY OF THE INVENTION

The invention is glide-height disk-tester that operates with the test disk rotating at a predetermined constant rotational speed and that has a glide slider with an electrically-resistive heater and a thermally-responsive protrusion pad located on its trailing end. The linear velocity of the disk relative to the slider maintains the slider at its nominal fly height, which is typically higher than any expected asperity. With no current applied to the heater, the protrusion pad is generally flush with the air-bearing surface of the slider. A controller coupled to the contact sensor is also coupled to electrical circuitry that applies current levels to the heater. The controller signals the circuitry to apply increasing levels of current to the heater, which causes corresponding increased expansion of the protrusion pad beyond the air-bearing surface of the slider and movement of the pad toward the disk. When the pad contacts an asperity, the contact sensor signals the controller, which then records the applied current level at the instant of asperity contact. The applied current level can be correlated to the glide height from a previous calibration process, for example by using a calibration disk with known calibration bump heights. During the calibration process the controller will have stored a group of measured current level values and corresponding bump height values. This group of values can be stored in a look-up table, or alternatively, the controller can run a program, such as a curve-fit algorithm, to generate a mathematical relationship or curve-fit between current value and height above the disk surface.

For a fuller understanding of the nature and advantages of the present invention, reference should be made to the following detailed description taken together with the accompanying figures.

DETAILED DESCRIPTION OF THE INVENTION

Figure 1:
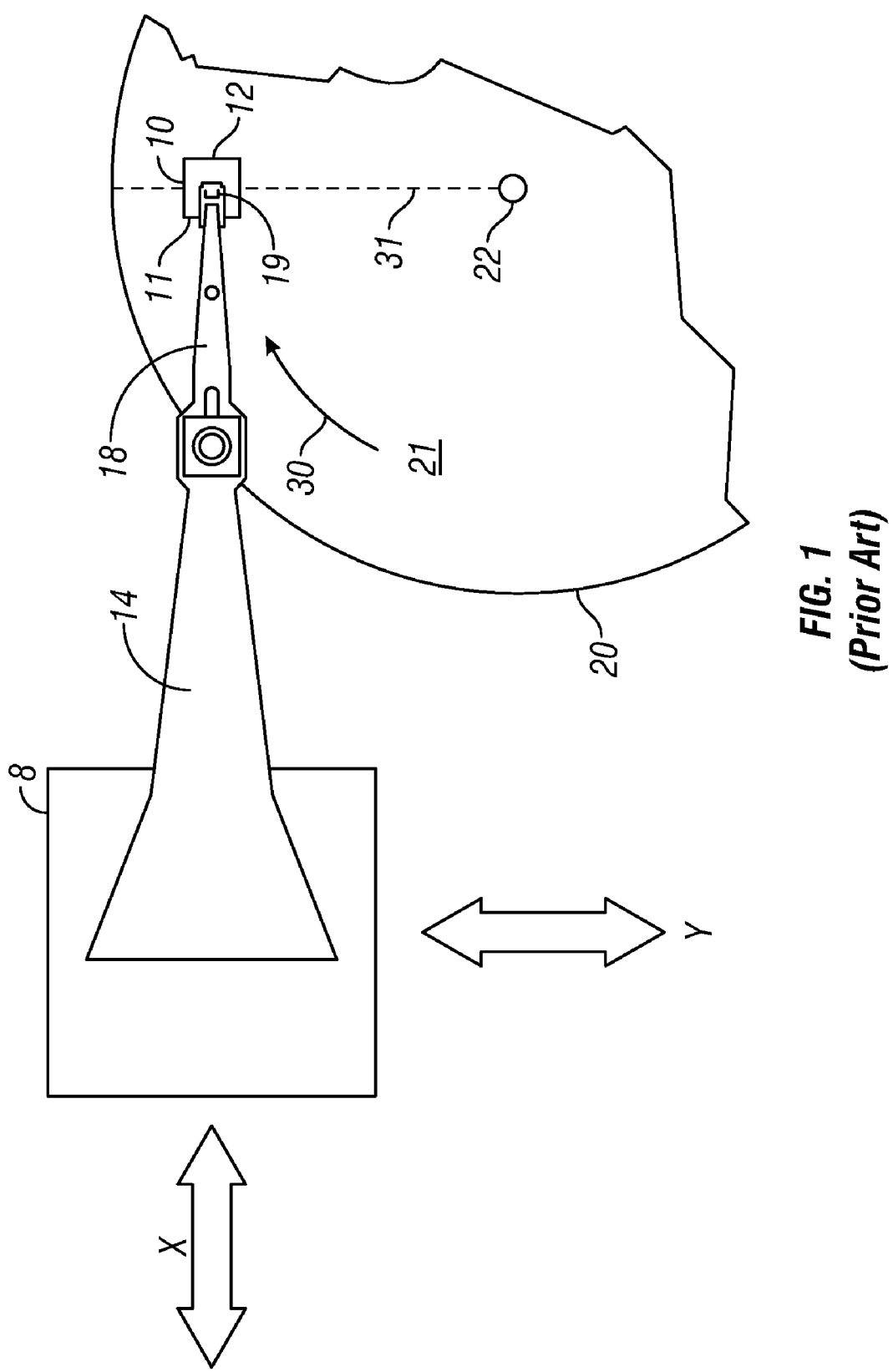
FIG. 1 is a top view of a portion of a conventional glide-height disk-tester showing a glide slider maintained above the surface of a test disk.

FIG. 1 is a top view of a portion of a conventional glide-height disk-tester showing a glide slider 10 (also called a glide head) maintained over the surface 21 of a test disk 20. The tester includes an X-Y stage actuator 8 with an arm 14 connected to the glide slider 10. A suspension includes a load beam 18 with one end attached to the arm 14 and the other end attached to a flexure 19. The flexure 19 supports the slider 10 above the surface 21 of disk 20. The disk 20 is rotated in the direction of arrow 30 by a motor (not shown) about an axis 22 perpendicular to the surface 21 of disk 20. The slider 10 has a front end 11 that faces the incoming air flow from the rotating disk, and a trailing end 8. The actuator 8 is movable in the Y-direction so that slider 10 can be moved to any desired radius along radial line 31. Thus for all radii the slider 10 has no "skew", i.e., the air flow is always generally perpendicular to the slider's front end 11. Since fly height is generally sensitive to the skew angle between the air bearing surface and the disk velocity, this configuration is usually preferred to control the fly height more accurately.

Figure 2A:
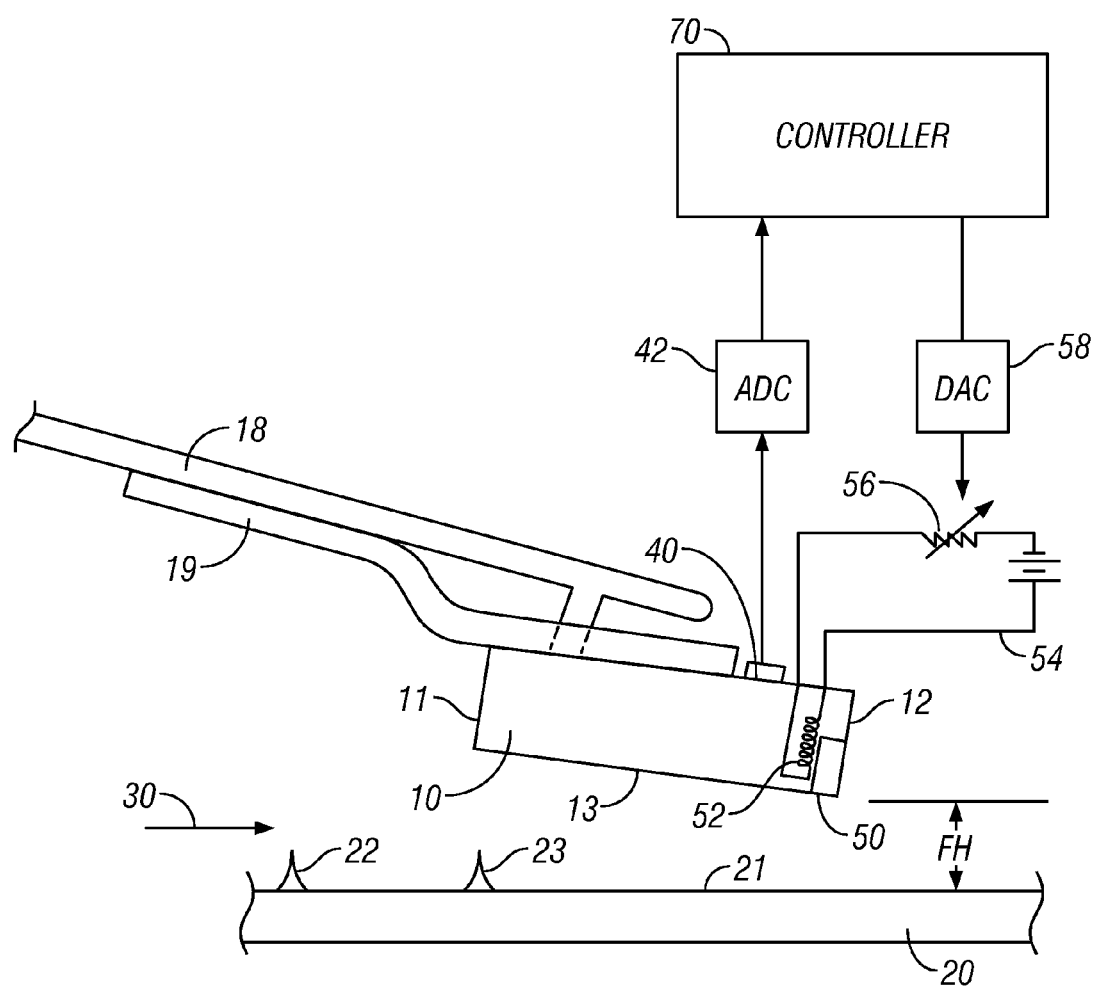
FIG. 2A is a schematic of the glide-height disk-tester of the present invention showing the slider with a thermally-responsive protrusion pad and control circuitry.

FIG. 2A is a high level schematic of the glide tester of the present invention showing the slider 10 maintained above disk 20 by the load beam 18 and flexure 19. As the disk rotates at a generally constant predetermined speed, air flow is induced to flow between the disk 20 and slider 10 in the direction shown by arrow 30. The slider has a front end 11, a trailing end 12, and a disk-facing surface 13 between the front end 11 and trailing end 12. The surface 13 is an air-bearing surface (ABS) that supports the slider 10 above the disk. The ABS is designed so that at the nominal operating disk rotational speed, the slider 10 has substantially the same fly height (FH) for all disk radii, even though the linear velocity of the disk relative to the slider varies with disk radius. The flexure 19 permits the slider 10 to "pitch" and "roll" slightly in response to the air flow acting on the ABS 13. The test disk 20 is represented as having a generally smooth surface 21, but with asperities of varying height that project above the disk surface 21, such as typical asperities 22, 23.

In the prior art method using the tester of FIG. 1, the disk is scanned at a first fixed linear velocity (by varying the disk rotational sapped as necessary), and then at additional fixed linear velocities that are incrementally lowered, with each reduced linear velocity causing a reduction in FH. This method has the disadvantages previously described.

In the embodiment described above and depicted in FIG. 1, an X-Y stage actuator is used so that the slider has no skew. However, the glide height disk tester can also use a rotary actuator, like that used in conventional disk drives. In that case the slider would not be moved precisely along a radius, as shown in FIG. 1, but would move along an arcuate path. This would create skew of the slider, meaning that the slider's front end would not be perpendicular to the air flow for all radii, so that the skew angle would vary with disk radius.

As is well-known, the slider 10 used in a glide-height disk-tester is equipped with a contact sensor 40 that detects when the slider 10 contacts an asperity 22, 23. The contact sensor 40 may be a piezoelectric sensor that generates an output signal in response to vibration of the slider. The piezoelectric sensor uses a piezoelectric material, such as lead-zirconium-titanate (PZT), that converts mechanical energy into an electrical signal. In a conventional glide-height disk-tester, the output of sensor 40 is filtered and analyzed by well-known signal processing circuitry (not shown) to provide information on the size and location of the asperity. For purposes of explaining the present invention, the output signal is sent to an analog-to-digital converter (ADC) 42, the output of which is input to a controller 70.

In the glide-height disk-tester of the present invention, the slider 10 also has a thermally-responsive protrusion pad 50 located at the trailing end 12. In response to the application of heat, the protrusion pad 50 expands relative to the body of slider 10 and moves toward the disk surface 21. An electrically-resistive heater 52 is located at the trailing end of slider 10 and is connected to electrical circuitry 54. Circuitry 54 can provide varying levels of current to heater 52 by various techniques, as represented, for example, by a variable resistor 56.

The protrusion pad 50 can be formed of the same material as the body of slider 10, such as the well-known alumina/titanium-carbide ceramic. In another embodiment the protrusion pad 50 can be a separate element bonded or sputter deposited onto the slider 10 and formed of a material having a coefficient of thermal expansion greater than the coefficient of thermal expansion of the material of slider 10. The heater 52 can be an electric heating element or coil embedded in protrusion pad 50 or in the slider at the trailing end 12 near the protrusion pad 50. U.S. Pat. No. 5,991,113 describes a disk drive with a slider having a read/write head that can be moved by a heating element. The disk drive of the '113 patent includes a temperature feedback control circuit that monitors the temperature of the heating element to maintain the fly height of the head constant during operation of the disk drive.

Figure 2B:
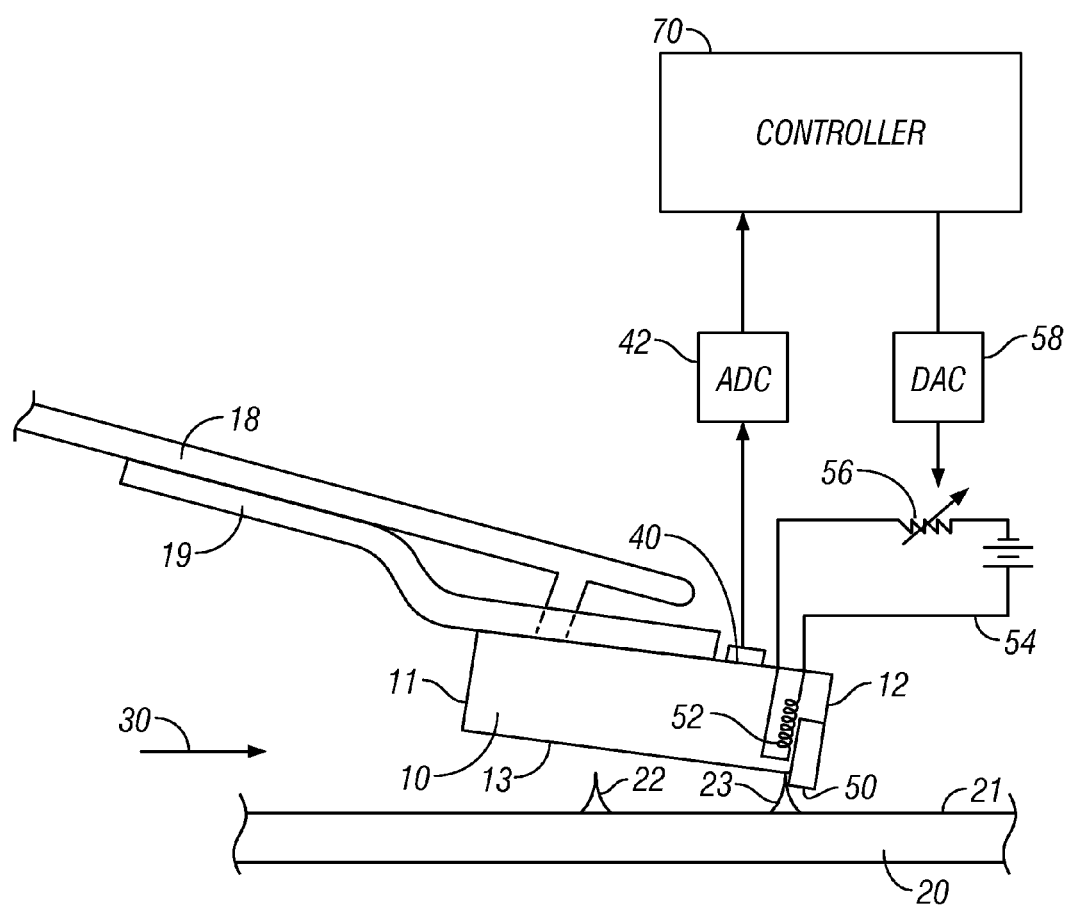
FIG. 2B shows the tester of FIG. 2A with the protrusion pad extending below the slider's disk-facing surface in contact with an asperity on the disk.

In the schematic of FIG. 2A, the protrusion pad 50 is shown as being substantially flush with ABS 13, which is the position it would have when no current is applied to heater 52. Thus, with no current applied to heater 52 and with the disk 20 rotating at its predetermined constant speed, the slider 10 has a nominal fly height FH, which is also the distance of protrusion pad 50 above the surface 21 of disk 20. When the trailing end 12 of slider 10 is heated, the protrusion pad expands and extends beyond the ABS 13 to move closer to the surface 21 of disk 20, as illustrated in FIG. 2B where the protrusion pad 50 is shown as being in contact with asperity 23.

The circuitry 54 is controlled by controller 70 that provides a signal to circuitry 54 through a digital-to-analog converter (DAC) 58. Signals from controller 70 control the current level applied to heater 52, such as by controlling the settings of variable resistor 56. The controller 70 is preferably implemented as a digital microprocessor connected to suitable memory and stored programs, but could be implemented in analog circuitry. In addition to providing output control signals to circuitry 54, controller 70 receives an input signal from contact sensor 40 whenever the slider 10 contacts an asperity 22, 23.

Figure 3A:
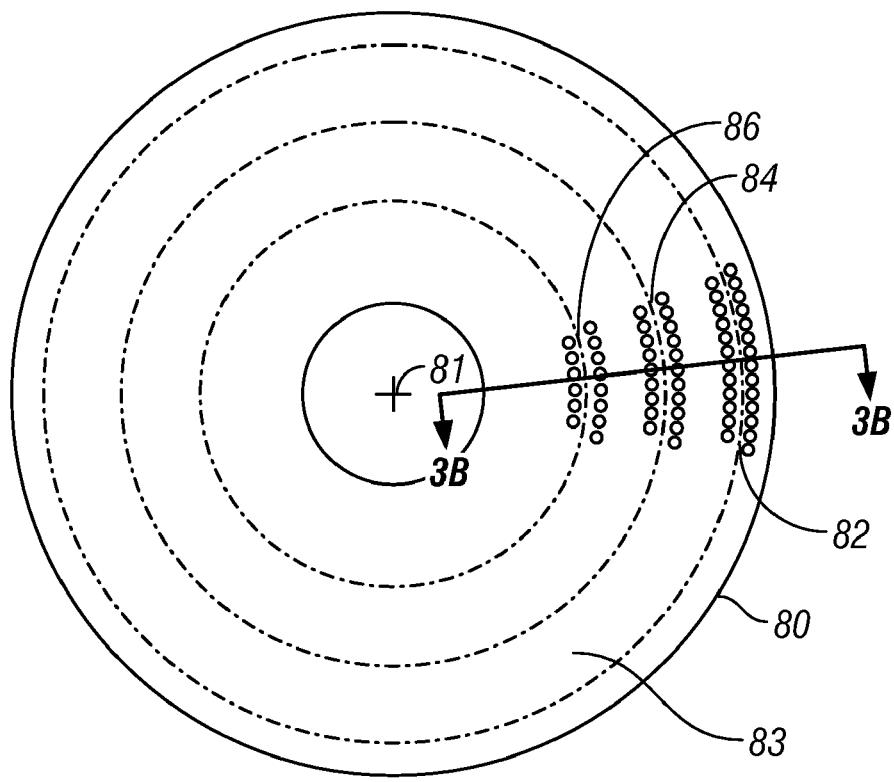
FIG. 3A is a top view of a calibration disk for use with the glide-height disk-tester of the present invention.
Figure 3B:
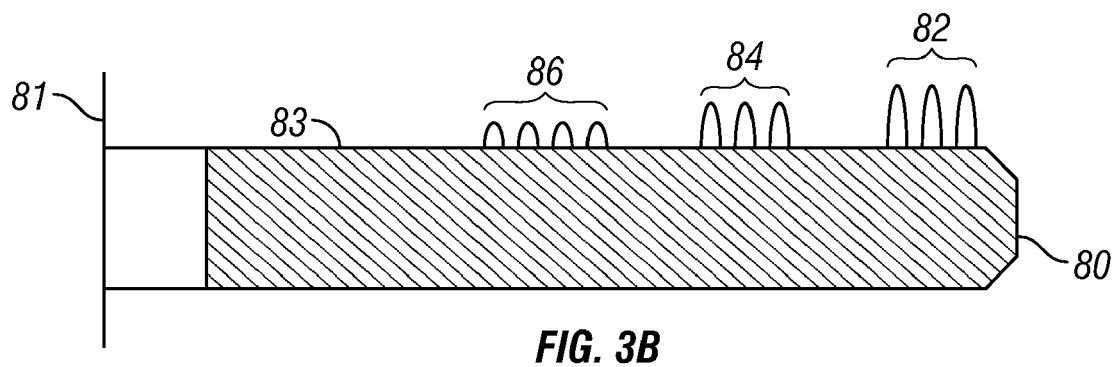
FIG. 3B is a sectional view of a portion of the calibration disk taken through section 3B—3B of FIG. 3A.

The glide-height disk-tester as described above can be calibrated with a calibration disk 80, as shown in FIGS. 3A–3B, that is located in the tester in place of test disk 20 (FIG. 2A). FIG. 3A is a top view of calibration disk 80 and FIG. 3B is a sectional view of a portion of disk 80 taken through section 3B—3B of FIG. 3A. The calibration disk has a smooth surface 81 and is rotated about an axis 83 perpendicular to surface 81. The disk 80 includes radially-spaced bands or sets of calibrated bumps, shown as sets of bumps 82, 84, 86. The bumps of each set all have substantially the same height above surface 81. For example, the bumps of sets 86, 84 and 82 can have bump heights of 2 nm, 4 nm and 6 nm, respectively. The bumps can be considered to be precisely-calibrated "asperities". With the use of this type of calibration disk, it is desirable to hit one bump at a time, so the bumps need to be far enough apart in the radial and circumferential directions. For current glide height testers, calibration disks with 32 bumps per revolution are used. It is useful to have several bumps along a track because the FH of the slider can change along the track because of local disk curvature. Thus the use of bumps at different angular positions can average out this effect. Calibration disks like that shown in FIGS. 3A–3B are well known, as are the methods for fabricating them with laser pulses and precisely measuring their bump heights, and are described in various references, such as U.S. Pat. No. 6,164,118.

The glide-height disk-tester is calibrated in the following manner. The calibration disk 80 is placed in the tester and rotated at a predetermined constant speed. The actuator 8 moves the slider 10 radially to position it above the first set 82 of calibrated bumps. At this point the slider 10 is essentially at its nominal fly height FH determined essentially by the load force from load beam 18, the ABS 13 and the disk rotational speed. Next the controller 70 signals the circuitry 54 to apply continuously increasing levels of current to heater 52. This causes the protrusion pad 50 to move down toward the bumps in set 82. As soon as the pad 50 contacts one of the bumps, the contact sensor 40 signals controller 70, which then records the applied current level at that instant. The applied current level is then stored in memory along with the known height of the bump in set 82. Instead of recording the current level when the first signal is received from contact sensor 40, the controller 70 can wait until a predetermined number of signals have been received from contact sensor 40 within a predetermined time window to assure that the protrusion pad has reached the bumps in set 82. The frequency content of the signal from the contact sensor can also be recorded and used to define in more detail the interaction between the bump and the protrusion pad at different heater current levels. The actuator 8 then moves the slider 10 radially to position it above the second set 84 of calibrated bumps, and the process is repeated. This continues for all sets of bumps on the disk 80. When the slider has been positioned over all sets of bumps, the pad lowered until the bumps are contacted by the pad, and the corresponding current levels recorded, the controller will have stored a group of measured current level values and corresponding bump height values. This group of values can be stored in a look-up table. Alternatively, the controller can run a program, such as a curve-fit algorithm, to generate a mathematical relationship or curve-fit between current value and height above the disk surface. Thus, the controller has calibrated current level with bump height for the calibration disk and is now able to correlate the current level applied at the instant of asperity contact on a test disk with the glide height of the test disk.

If the tester uses a rotary actuator, rather than an X-Y stage actuator, then the calibration can be done at different disk radii to take into consideration the effect of slider skew. While slider ABS designs can be made to have substantially the same FH at different disk radii for the constant disk operating rotational speed, there can still be a few nanometer difference between the highest and lowest FH. In such an embodiment, the current level/bump height relationship can be calibrated at different radii. The calibration curve can then be extrapolated for all radii. The advantage of a glide height disk tester with a rotary actuator and this calibration method is that the slider FH characteristics can be as close as possible to those found in the actual disk drive.

The use of a calibration disk as described above is one method of calibration of the tester of this invention. Other methods of calibration are possible. For example, current to the heater can be increased until contact with a "golden" disk is detected. The spacing between a disk and a slider when contact occurs is often called the "Take-Off-Height" or "TOH". It is the smallest spacing at which the slider can fly in a stable manner over a given disk. It is well known that the TOH depends on certain disk properties such as roughness, waviness, lubricant type and lubricant thickness. One can optimize these properties to define a "golden" disk with a very low TOH, and subsequently use that disk to measure the heater current necessary to reach this TOH. A second "golden" disk with a different TOH can be used to generate a curve of heater current vs. fly height. Or, the "golden" disk can be a disk which is known, by an alternate method, to have low enough or small enough asperities to cause no damage. This disk can then be used to determine the heater current for the QGHT of the disk to be tested. Or the slider can include a conventional MR read head on the protrusion pad. The MR readback signal amplitude will be proportional to the spacing of the MR element from the disk surface and can also be used to measure magnetic properties such as bit error rate (BER), overwrite (OW) or pulse half width (PW50). The heater current is increased until a reference readback signal is obtained from the MR head on a golden disk. This current setting is then used to define the QGHT.

After the glide-height disk-tester has been calibrated, the operation of the tester with a test disk is straightforward. The test disk 20 is placed in the tester and rotated at a predetermined constant speed, as shown again in FIG. 2. The controller 70 signals the circuitry 54 to apply continuously increasing levels of current to heater 52. This causes the protrusion pad 50 to move down toward the surface 21 of disk 20. As soon as the pad 50 contacts an asperity 22 or 23, as illustrated in FIG. 2B, the contact sensor 40 signals controller 70, which then records the applied current level at that instant. This process can be repeated at several radial locations on the test disk 20, with the actuator 8 moving the slider to the desired radial location on the test disk. The controller then recalls from the look-up table, or calculates from the previously generated curve-fit, the height values corresponding to the current levels that were applied when contact was detected. The qualification standards for the disk may define the glide height (GH) as the height of the first contact. Alternatively, the qualification standards for a particular disk may define the GH as a predetermined number of contacts at a specific fly height for a measured area of the disk. The standard is called the qualified glide height (QGHT) which means that the disk can have no asperities above QGHT.

Because the glide height of the test disk can be measured at rotational speeds of the test disk such that the linear head/disk velocity at impact with an asperity is constant for all asperities, the output signals from the contact sensor for different asperities can be more reliably compared and thus more reliably used to estimate the sizes of the asperities. In addition, because the velocity of the air flow beneath the slider's ABS is essentially constant, the pitch and roll motion of the slider is essentially the same for all asperity contacts, which eliminates another variable in estimating the size of the asperities contacted by the protrusion pad.

Because the glide height of the test disk can be measured at essentially the same rotational speed and skew angles as in the disk drive product that the test disk is intended for, and using an ABS design for the glide head similar to the ABS design in the intended product, the sensitivity to asperity contacts at glide test will be closely matched to the sensitivity of the product slider on the product disk in the final hard disk drive, which increases the relevance of the glide test for the intended product.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A glide-height disk tester comprising:
   a rotatable disk having a generally smooth disk surface with a plurality of asperities projecting from the disk surface;
   a motor for rotating the disk at a generally constant speed about an axis substantially perpendicular to the disk surface;
   a slider having a front end upstream of the air-flow induced from the disk when the disk is rotating, a trailing end downstream from the front end, an air-bearing surface between the front and trailing ends and facing the disk surface, and a protrusion pad at the trailing end and movable toward the disk surface in response to the application of heat;
   a contact sensor on the slider for detecting contact of the protrusion pad with an asperity when the disk is rotating at said constant speed; and
   electrical circuitry coupled to the trailing end of the slider for applying current to the trailing end to resistively heat the protrusion pad while the disk is rotating at said constant speed, the level of applied current determining the amount of movement of the protrusion pad toward the disk surface.

2. The tester of claim 1 further comprising a controller coupled to said circuitry and to the contact sensor, the controller directing said circuitry to increase the applied current level until the protrusion pad contacts an asperity, the controller recording the applied current level when a contact detection signal is received from the contact sensor.

3. The tester of claim 2 wherein the controller correlates the recorded applied current level with a glide height.

4. The tester of claim 1 wherein the disk is a calibration disk and wherein the plurality of asperities comprises a plurality of sets of calibration bumps, each set projecting above the disk surface a unique calibration bump height.

5. The tester of claim 1 wherein the protrusion pad is formed of a material having a coefficient of thermal expansion greater than the coefficient of thermal expansion of the slider material.

6. The tester of claim 1 further comprising an electrically-resistive heater at the slider trailing end and thermally coupled to the protrusion pad, the heater being electrically connected to said circuitry.

7. The tester of claim 6 wherein the heater is embedded in the protrusion pad.

8. The tester of claim 1 wherein the contact sensor is a piezoelectric element.

9. A method for glide-height testing of a disk having a generally smooth disk surface and a plurality of asperities projecting above the disk surface, the method comprising:
   rotating the test disk at a generally constant speed about an axis substantially perpendicular to the disk surface;
   maintaining an air-bearing slider near the surface of the rotating disk, the slider having a front end upstream of the air-flow induced from the rotating disk, a trailing end downstream from the front end, a contact sensor for detecting contact of the protrusion pad with an asperity, and a protrusion pad at the trailing end and movable toward the disk surface in response to electrically-resistive heating;
   applying electrical current to the trailing end of the slider in increasing current levels;
   monitoring the output of the contact sensor during the application of said increasing current levels; and
   recording the current level applied when a signal from the contact sensor is detected, said recorded current level being representative of the glide height of the test disk.

10. The method of claim 9 wherein recording the current level comprises recording the current level applied when a predetermined plurality of signals from the contact sensor are detected.

11. The method of claim 9 wherein the test disk has a qualified glide height (QGHT), the method further comprising passing the test disk as a qualified disk if no signal from the contact sensor is detected during the application of increasing current levels to a level beyond the current level corresponding to the QGHT.

12. A method for calibrating a glide-height disk tester, the tester including a slider having a front end upstream of the air-flow induced from the disk when the disk is rotating, a trailing end downstream from the front end, an air-bearing surface between the front and trailing ends and facing the disk surface, and a protrusion pad at the trailing end and movable toward the disk surface in response to the application of heat, the calibration method comprising:
   providing a calibration disk having a generally smooth disk surface and a plurality of sets of calibration bumps, each set of bumps projecting above the disk surface a unique calibration bump height;
   rotating the disk at a generally constant speed about an axis substantially perpendicular to the disk surface;
   heating the protrusion pad to move the pad toward the disk surface while the disk is rotating at said constant speed;
   detecting when the protrusion pad contacts bumps in a first set of calibration bumps;
   recording the level of heat applied when contact with the first set of bumps is detected;
   repeating the steps of detecting and recording for each set of bumps; and
   correlating, from the recorded heat levels and corresponding bump heights, a heat level with a glide height.

13. The method of claim 12 wherein heating the protrusion pad comprises applying electrical current to the trailing end of the slider to heat the pad by electrically-resistive heating, and wherein recording the level of heat applied comprises recording the level of electrical current applied to the trailing end of the slider.

14. The method of claim 13 wherein correlating comprises generating a look-up table of values representative of the recorded current levels and corresponding bump heights.

15. The method of claim 13 wherein correlating comprises generating a relationship between current level and glide height from a curve-fit of recorded current levels and corresponding bump heights.

16. The method of claim 13 wherein the slider has an electrically-resistive heater at the slider trailing end and thermally coupled to the protrusion pad, wherein applying electrical current to the trailing end of the slider comprises applying electrical current to the heater, and wherein recording the level of heat applied comprises recording the level of electrical current applied to the heater.

* * * * *